Figure 1:
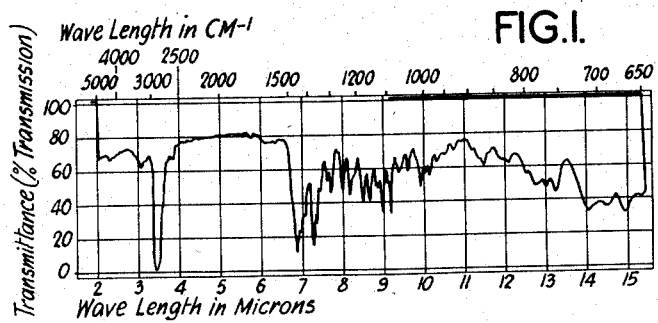

March 1, 1960    P. GAILLIOT ET AL    2,927,115
AZA-BICYCLO-(3,2,1)-OCTANES

Filed June 17, 1957    3 Sheets-Sheet 1

Inventors
Paul Gailliot
Jean Baget
Pierre Sarret
by Stevens Davis Miller Mosher
their attorneys March 1, 1960 P. GAILLIOT ET AL 2,927,115
AZA-BICYCLO-(3,2,1)-OCTANES Filed June 17, 1957 3 Sheets-Sheet 2

United States Patent Office 2,927,115
Patented Mar. 1, 1960

2,927,115

AZA-BICYCLO-(3,2,1)-OCTANES

Paul Gailliot, Paris, Jean Baget, Ermont, and Pierre Sarret, Fontenay-sous-Bois, France, assignors to Societe des Usines Chimiques Rhone-Poulenc, Paris, France, a French body corporate Application June 17, 1957, Serial No. 666,186

Claims priority, application France June 15, 1956

5 Claims. (Cl. 260—293)

This invention is for improvements in or relating to organic compounds and more particularly relates to new aza-bicyclo-alkanes.

It is an object of the present invention to provide new aza-bicyclo-alkanes possessing unexpectedly useful pharmacological activity. It is a further object of the invention to provide a process for the conversion of 3-nitro-isocamphane into new substances which exhibit powerful ganglion blocking activity. Further objects will appear from the disclosure which follows.

The aforesaid objects are broadly achieved by treating with lithium aluminium hydride the compound 3-nitro-isocamphane having the planar formula:

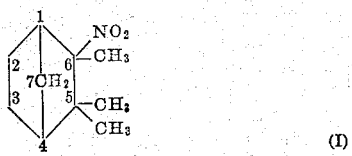

(I)

and, if desired (as is preferred), methylating a secondary amine fraction thus produced. The course of the foregoing reaction with lithium aluminium hydride, which involves a structural rearrangement in the form of ring expansion in which the exocyclic nitrogen atom of the nitro group becomes part of the ring structure, is entirely unexpected. By analogy with the reduction of 3-nitro-isocamphane by means of iron and hydrochloric acid or by catalytic hydrogenation, the reaction with lithium aluminium hydride should have resulted in mere replacement of the nitro group by a primary amino group.

The reaction yields a mixture of secondary amine isomers which may be separated by standard procedures as will be illustrated in the examples which follow, but which may be isolated as such, these mixtures (and the mixtures of tertiary amines produced by the methylation thereof) being, of course, therapeutically useful and capable therefore of direct pharmaceutical application in formulations of standard type.

The compounds produced in accordance with the invention are aza-bicyclo-(3,2,1)-octanes conforming to either one or other of the planar Formulae II and III.

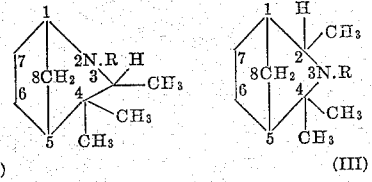

where R represents a hydrogen atom or a methyl group. Such compounds can exist in geometrically and optically isomeric forms and all such forms and mixtures and racemates thereof are within the scope of the invention. These compounds are of considerable importance because of the hypotensive properties they have been demonstrated to possess, these properties being characteristic not only of individual isomers but also, naturally, of mixtures thereof. For therapeutic purposes they can be administered in the manner customary for ganglion blocking agents, i.e. by the subcutaneous or oral routes. The bases are preferably employed in the form of salts containing pharmaceutically acceptable anions. Suitable acid addition salts include the hydrochlorides and other hydrohalides, phosphates, nitrates, sulphates, maleates, fumarates, citrates, tartrates, oxalates, methane sulphonates and ethane disulphonates. Suitable quaternary ammonium compounds include methohalides and the corresponding methylsulphates and tartrates.

The invention is illustrated by the following examples.

Example I

The crude 5:5:6-trimethyl-6-nitro-bicyclo-(2,2,1)-heptane, prepared by the method of Hückel and Nerdel (Ann. 528, 57, (1937)), from d-camphene hydrochloride (415 g.), in ether (4 l.), was added during 2 hours to lithium aluminum hydride (171 g.) in ether (4 l.). The suspension was stirred at room temperature for a further 17 hours. Water (160 ml.) and 15% w./v. sodium hydroxide (160 ml.), followed by a further quantity of water (500 ml.), were added over 3 hours. After filtration the ether layer was extracted with 2 N hydrochloric acid (385 ml.) and then water (400 ml.). The acid extracts were combined and rendered alkaline with 50% sodium hydroxide. The liberated base was extracted with ether and dried over magnesium sulphate. The suspension was filtered and the ether removed in vacuo, producing a pale yellow oil (40.3 g.). This oil (40 g.) was reacted with the theoretical quantity of benzaldehyde in dry refluxing benzene until no more water distilled out (1 hour). The benzene solution was ice-cooled and extracted with ice-cold acetic acid (3×40 ml.). The acid layer was rendered alkaline with 50% w./v. sodium hydroxide. The liberated base was extracted with ether (4×50 ml.) and dried over magesium sulphate. The suspension was filtered and the ether removed in vacuo, producing a mixture of two secondary bases (28.5 g.). The infra-red absorption spectrum of this mixture of bases is shown in Figure 1 and exhibits characteristic absorption bands at the following wavelengths expressed in microns (uncertainty ±0.02 micron): 3.07, 3.44, 3.51, 3.61, 3.80, 3.85, 6.87, 6.96, 7.06, 7.29, 7.36, 7.44, 7.61, 7.70, 7.73, 7.86, 8.00, 8.17, 8.27, 8.50, 8.66, 8.82, 8.88, 8.99, 9.11, 9.18, 9.38, 9.42, 9.62, 9.91, 10.02, 10.05, 10.15, 10.31, 10.53, 10.74, 11.20, 11.40, 11.50, 11.61, 11.89, 11.95, 12.10, 12.54, 12.76, 12.89, 13.02, 13.26, 14.05, 14.50, 14.95, 15.32.

An ethereal solution of the bases was treated with ethereal hydrogen chloride. A white solid appeared which, on recrystallisation from dry ethanol/ether, gave colourless prisms of the hydrochlorides, M.P. 250–270° C., of a mixture of two bases represented by the planar structures 2-aza-3:4:4-trimethyl-bicyclo-(3,2,1)-octane and/or 3-aza-2:4:4-trimethyl-bicyclo-(3,2,1)-octane.

Figure 2:
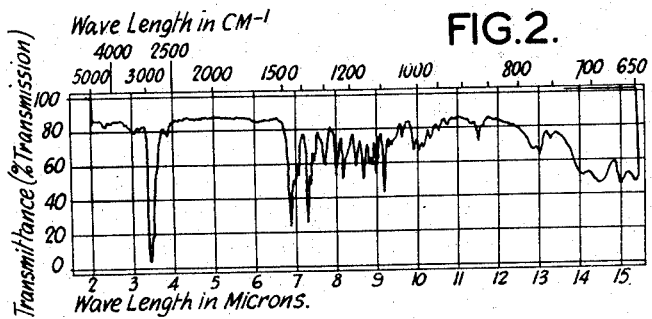
Figure 3:
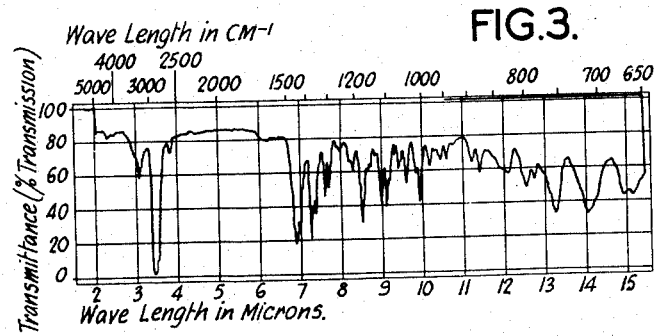

This aforementioned mixture may be separated if desired by, for example, gas chromatography, into a more volatile fraction (65%), which has the infra-red absorption spectrum shown in Figure 2 and exhibits characteristic absorption bands at the following wavelengths expressed in microns (uncertainty±0.02 micron): 3.05, 3.43, 3.51, 3.60, 3.79, 3.85, 6.87, 6.96, 7.01, 7.07, 7.29, 7.37, 7.44, 7.69, 7.73, 8.00, 8.18, 8.28, 8.49, 8.67, 8.81, 8.88, 8.99, 9.19, 9.31, 9.38, 9.45, 9.63, 9.91, 10.04, 10.15, 10.30, 10.52, 10.75, 10.91, 11.20, 11.32, 11.50, 12.85, 13.01, 13.29, 14.05, 14.50, 15.01, 15.36, and a less volatile fraction (35%) which has the infra-red absorption spectrum shown in Figure 3 and exhibits characteristic absorption bands at the following wavelengths expressed in microns (uncertainty±0.02 microns): 3.08, 3.42, 3.47, 3.51, 3.82, 3.84, 6.89, 6.96, 7.05, 7.25, 7.31, 7.36, 7.61, 7.70, 7.90, 7.96, 8.20, 8.30, 8.46, 8.51, 8.56, 8.65, 8.71, 8.84, 8.98, 9.11, 9.19, 9.41, 9.60, 9.84, 9.93, 10.17, 10.45, 10.58, 11.20, 11.40, 11.95, 12.08, 12.53, 12.74, 13.25, 14.05, 14.94, 15.16.

*Example II*

Figure 4:
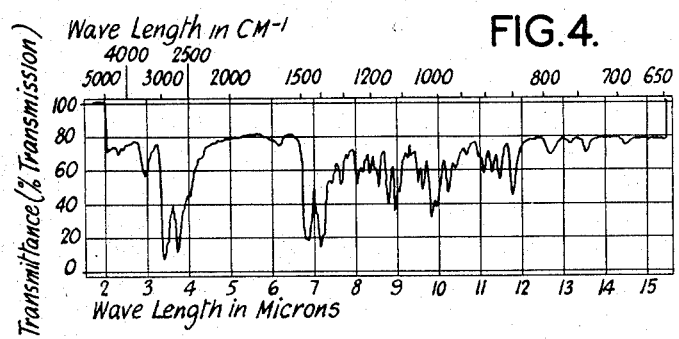

The aforementioned mixture of two secondary amines (30 g.) was added at below 30° C. to 90% formic acid (24 g.). The mixture was warmed to 65–70° C. and 40% formaldehyde (21.5 g.) was added. The reaction mixture was heated at 95–100° C. for 21 hours. Hydrochloric acid (10 N:19.8 ml.) was added and the solution was evaporated in vacuo, giving an off-white solid mass. This solid was dissolved in water and treated with strong sodium hydroxide. The precipitated base was extracted into ether and dried over sodium sulphate. After filtration the ethereal solution was treated with dry ethereal hydrogen bromide. The precipitated solid was filtered, washed with ether and dried over potassium hydroxide. The crude hydrobromide was recrystallised from dry ethanol/ether and dried at 42° C., to give 30 g. of a mixture of the hydrobromides of two isomeric bases represented by the planar structures 2-aza-2:3:4:4-tetramethyl-bicyclo-(3,2,1)-octane and/or 3 - aza - 2:3:4:4-tetramethyl-bicyclo-(3,2,1)-octane. This mixture of hydrobromides has M.P. 250–270° C. and has the infra-red absorption spectrum shown in Figure 4 (when measured by the potassium bromide pressed disc technique) and exhibits characteristic absorption bands at the following wavelengths expressed in microns (uncertainty±0.02 microns): 3.42, 3.50, 3.56, 3.65, 3.73, 4.01, 6.81, 6.87, 7.06, 7.16, 7.24, 7.42, 7.64, 7.80 8.02, 8.17, 8.24, 8.34, 8.47, 8.55, 8.80, 8.95, 9.04, 9.24, 9.33, 9.50, 9.61, 9.84, 9.94, 10.22, 10.40, 10.66, 10.97, 11.07, 11.28, 11.46, 11.77, 12.69, 13.15, 13.54, 14.50.

*Example III* d-Camphene (420 g.), $[\alpha]_D^{20} = +21.30°$ (c.=5, alcohol), in petroleum ether (450 cc.) is saturated in 1½ hours with dry hydrogen chloride with agitation and cooling to −40° C. Petroleum ether and the excess hydrogen chloride are then removed in vacuo at a low temperature and the d-camphene hydrochloride thus obtained is dried in vacuo in the presence of potassium hydroxide. There is obtained 515 g., M.P. 163° C. (Kofler).

d-Camphene hydrochloride (415 g.) is dissolved in anhydrous ether (3 l.), silver nitrite (380 g.) is then added in small portions to the solution obtained, the temperature being maintained at +3° C. and agitation is continued for 24 hours, the temperature being maintained at about +3° C. The silver chloride formed is separated and the ethereal solution of 3-nitro-isocamphane thus obtained is used directly for the following stage.

This solution is added gradually so as to maintain a gentle reflux to an agitated mixture of lithium aluminium hydride (171 g.) and ether (4 l.). Agitation is continued overnight and the mixture is then treated with water (160 cc.) and 15% aqueous sodium hydroxide (160 cc.), followed by water (500 cc.). The precipitate formed is filtered off and washed with ether. The combined ethereal solutions are acidified with normal hydrochloric acid (385 cc.) and extracted with water (400 cc.).

The aqueous solution thus obtained is treated with lithium picrate and there is thus obtained, after recrystallisation from aqueous alcohol, a picrate (93 g.), M.P. 199° C. (Kofler).

This picrate is converted into the corresponding base (35 g.), the base is dissolved in benzene (100 cc.) and benzaldehyde (24.2 g.) is added. The mixture is heated for 3 hours at 100° C. and the benzene and water are then removed by distillation under normal pressure and then in vacuo.

Methyl sulphate (28.8 g.) is added cautiously to the base thus obtained. The reaction is vigorous and is completed by heating for 3 hours at 100° C.

Figure 5:
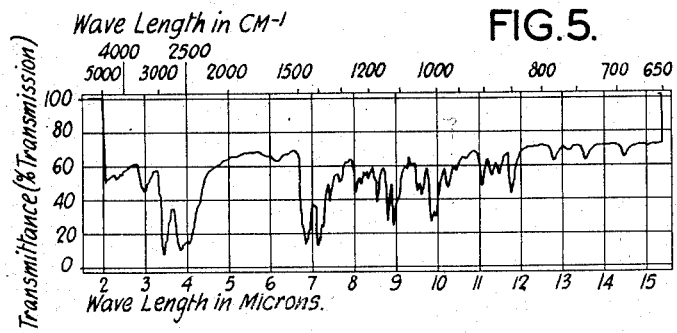

To the product obtained there is added alcohol (200 cc.), followed by water (100 cc.) and the mixture is heated for three hours under reflux. The alcohol is driven off and the aqueous solution is extracted with ether (3×50 cc.) and made alkaline. The base which separates is extracted with ether, the ethereal extract is dried and the ether is removed in vacuo. There is thus obtained a mixture of bases (27.7 g.) which is dissolved in acetone (200 cc.) and, on the addition of the theoretical quantity of ethereal hydrogen chloride, there is precipitated the hydrochloride of a product A, M.P.=315–320° C. which is relatively insoluble in acetone. Treatment of the acetone mother liquor with a saturated acetone solution of picric acid, followed by recrystallisation of the precipitate from 30% ethanol (600 cc.) gives 18 g. of a picrate, M.P. 275–276° C. On conversion into the hydrochloride and recrystallisation from methylethyl ketone (25 cc.), there is obtained the hydrochloride of a product B (3 g.), M.P. 252–255° C. The infra-red absorption spectrum of this hydrochloride is shown in Figure 5 (when measured by the potassium bromide pressed disc technique), and exhibits characteristic absorption bands at the following wavelengths expressed in microns (uncertainty±0.02 micron): 3.45, 3.51, 3.85, 4.05, 6.75, 6.85, 6.87, 6.92, 7.03, 7.14, 7.19, 7.25, 7.40, 7.64, 7.70, 8.03, 8.16, 8.25, 8.34, 8.50, 8.55, 8.80, 8.94, 9.03, 9.25, 9.51, 9.61, 9.85, 9.95, 10.24, 10.43, 10.66, 11.07, 11.30, 11.46, 11.75, 12.80, 13.13, 13.55, 14.45.

The hydrochlorides of both product A and product B are optically inactive.

It should be noted that it was at first thought that products A and B were isomeric 3-methylamino-isocamphanes but subsequent investigation revealed that product A isolated as above described is, in fact, a mixture of compounds, while product B is the hydrochloride of a mixture of the same isomeric tertiary bases as are produced by the procedure of Example II.

*Example IV*

Figure 6:
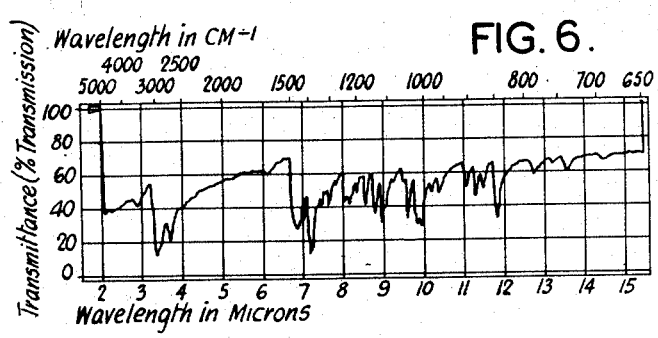

The pure secondary base, prepared and separated by the method described in Example I and having the infra-red absorption spectrum shown in Figure 2 was methylated in a manner similar to that described in Example II. The reaction product after treatment with the excess 10 N hydrochloric acid was evaporated in vacuo, to give an off white solid mass. A solution of this solid in water was treated with excess saturated potassium iodide solution. The white precipitate was collected and crystallised from dry ethanol. The product which separated was the hydriodide of a tertiary base represented by the planar structure 3 (or 2)-aza-2:3:4:4-tetramethyl-bicyclo-(3,2,1)-octane. This hydriodide has M.P. 299–300° C. (decomp.), has the infra-red absorption spectrum shown in Figure 6 (when measured by the potassium bromide pressed disc technique) and exhibits characteristic absorption bands at the following wavelengths expressed in microns (uncertainty ±0.02 micron): 2.80, 2.85, 3.30, 3.37, 3.46, 3.64, 3.68, 4.00, 6.78, 6.85, 6.88, 6.94, 7.02, 7.14, 7.18, 7.23, 7.35, 7.46, 7.57, 7.64, 7.81, 8.04, 8.16, 8.23, 8.33, 8.55, 8.80, 8.96, 9.04, 9.24, 9.48, 9.60, 9.78, 9.85, 9.94, 10.20, 10.38, 11.06, 11.28, 11.46, 11.82, 12.72, 13.20, 13.55, 14.45.

*Example V*

Figure 7:
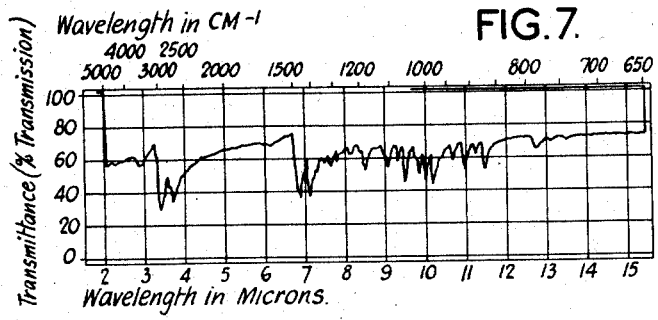

The pure secondary base, prepared and separated by the method described in Example I and having the infra-red absorption spectrum shown in Figure 3, was methylated in a manner similar to that described in Example IV, to give the hydriodide of a tertiary base represented by the planar structure 3 (or 2)-aza-2:3:4:4-tetramethyl-bicyclo-(3,2,1)-octane. This hydriodide has M.P. 332–335° C. (decomp.), has the infra-red absorption spectrum shown in Figure 7 (when measured by the potassium bromide pressed disc technique) and exhibits characteristic absorption bands at the following wavelengths expressed in microns (uncertainty ±0.02 micron): 2.87, 3.37, 3.40, 3.46, 3.61, 3.70, 3.97, 6.82, 6.89, 6.97, 7.12, 7.14, 7.20, 7.28, 7.43, 7.50, 7.59, 7.64, 7.66, 7.78, 7.90, 8.10, 8.15, 8.38, 8.46, 8.50, 8.78, 8.96, 9.06, 9.31, 9.50, 9.78, 9.85, 10.00, 10.18, 10.24, 10.36, 10.67, 10.96, 11.24, 11.46, 12.74, 13.10.

We claim:

1. A member of the class consisting of 2-aza-3:4:4-trimethyl - bicyclo - (3,2,1) - octane, 2-aza-2:3:4:4-tetramethyl - bicyclo - (3,2,1)-octane, 3-aza-2:4:4-trimethyl-bicyclo-(3,2,1)-octane, 3-aza-2:3:4:4 - tetramethyl-bicyclo-(3,2,1)-octane and their acid addition salts formed with acids having pharmaceutically inert anions.

2. 2-aza-3:4:4-trimethyl-bicyclo-(3,2,1)-octane.
3. 2-aza-2:3:4:4-tetramethyl-bicyclo-(3,2,1)-octane.
4. 3-aza-2:4:4-trimethyl-bicyclo-(3,2,1)-octane.
5. 3-aza-2:3:4:4-tetramethyl-bicyclo-(3,2,1)-octane.

References Cited in the file of this patent

FOREIGN PATENTS 583,565     Germany _____ Sept. 21, 1933

OTHER REFERENCES

Index Chem. Abst., vol. 49, p. 239s (1955).
Index Chem. Abst., vol. 47, p. 177s, col. 3 (1953).
Index Chem. Abst., vol. 47, p. 327s (1953).